(12) United States Patent
Buhro et al.

(10) Patent No.: US 11,975,862 B2
(45) Date of Patent: May 7, 2024

(54) DATABASE QUERY PROCESSING FOR HARDWARE COMPONENT IDENTIFICATION USING MULTI-ORDERED MACHINE LEARNING MODELS

(71) Applicant: CAMP Systems International, Inc., Merrimack, NH (US)

(72) Inventors: Jason W Buhro, Austin, TX (US); Heather O Levesque, New Brunswick (CA); Lisa K Garcia, Olive Branch, MS (US); Ashley B Neeley, Germantown, TN (US); Sean M Lanagan, Concord, MA (US); John P Herrman, Eads, TN (US)

(73) Assignee: CAMP Systems International, Inc., Merrimack, NH (US)

( * ) Notice: Subject to any disclaimer, the term of this patent is extended or adjusted under 35 U.S.C. 154(b) by 506 days.

(21) Appl. No.: 17/213,118

(22) Filed: Mar. 25, 2021

(65) Prior Publication Data

US 2022/0306314 A1 Sep. 29, 2022

(51) Int. Cl.
*B64D 45/00* (2006.01)
*G06F 16/2457* (2019.01)
(Continued)

(52) U.S. Cl.
CPC ....... *B64D 45/00* (2013.01); *G06F 16/24578* (2019.01); *G06F 16/248* (2019.01);
(Continued)

(58) Field of Classification Search
CPC ............ B64D 45/00; B64D 2045/0085; G06F 16/24578; G06F 16/248; G06N 5/04; G06N 20/00
See application file for complete search history.

(56) References Cited

U.S. PATENT DOCUMENTS 10,157,347 B1 12/2018 Kasturi et al.
10,380,510 B1 8/2019 Slack et al.
(Continued)

OTHER PUBLICATIONS

PCT International Search Report and Written Opinion, PCT Application No. PCT/US2022/021201, dated Jul. 26, 2022, 16 pages.

*Primary Examiner* — Rachid Bendidi
*Assistant Examiner* — Dana F Artimez
(74) *Attorney, Agent, or Firm* — Fenwick & West LLP (57) ABSTRACT

A device receives a data query from a source, the data query associated with a hardware component. The device determines a likelihood that an aircraft of an aircraft entity associated with the data query will require the hardware component by retrieving a plurality of signals received from the aircraft entity that are associated with the hardware component, applying the plurality of signals to a first machine-learned model, and receiving, as output from the first machine-learned model, a likelihood that the aircraft will require the hardware component. The device inputs the likelihood into a second machine-learned model, and receives as output a score corresponding to the data query. The device assigns a rank to the data query based on its score as compared to scores of other data queries of a plurality of data queries, and displays an ordered list of the plurality of data queries.

18 Claims, 5 Drawing Sheets

(51) Int. Cl.
*G06F 16/248* (2019.01)
*G06N 5/04* (2023.01)
*G06N 20/00* (2019.01)

(52) U.S. Cl.
CPC .............. *G06N 5/04* (2013.01); *G06N 20/00* (2019.01); *B64D 2045/0085* (2013.01)

(56) References Cited

U.S. PATENT DOCUMENTS

| | | | |
|---|---|---|---|
| 2005/0144095 A1* | 6/2005 | Scruton | G06Q 10/10 707/999.1 |
| 2011/0087513 A1 | 4/2011 | Floyd et al. | |
| 2019/0177008 A1 | 6/2019 | Floyd et al. | |
| 2020/0074758 A1 | 3/2020 | Boggio et al. | |
| 2020/0104793 A1 | 4/2020 | Wang et al. | |
| 2020/0354086 A1 | 11/2020 | Wang | |
| 2021/0097058 A1 | 4/2021 | Skiles et al. | |
| 2021/0304133 A1* | 9/2021 | Anandam | G06N 20/00 |

\* cited by examiner

502
Receive a data query from a source, the data query associated with a hardware component

504
Determine a likelihood that an aircraft of an aircraft entity associated with the data query will require the hardware component

506
Input the likelihood into a second machine-learned model

508
Receive as output from the second machine-learned model a score corresponding to the data query

510
Assign a rank to the data query based on its score as compared to scores of other data queries of a plurality of data queries

512
Generate for display an ordered list of the plurality of data queries, as ordered based on the respective scores of the plurality of data queries

FIG. 5

DATABASE QUERY PROCESSING FOR HARDWARE COMPONENT IDENTIFICATION USING MULTI-ORDERED MACHINE LEARNING MODELS

TECHNICAL FIELD

The disclosure generally relates to the field of aircraft hardware components, and more specifically relates to using machine learning to predict upcoming replacements of aircraft hardware components.

BACKGROUND

Aircrafts have myriad hardware components for operating everything from piloting systems, landing gears, wing systems, passenger safety gear, and so on. Each individual component has its own rate of natural wear and tear, relative to other hardware components on an aircraft, and that rate may increase or decrease based on rate and type of usage. Part suppliers that supply replacement hardware components for aircrafts receive requests to provide replacements ad hoc from aircraft entities, and in the aggregate across myriad aircrafts of myriad aircraft entities, renders the part suppliers unable to timely supply the replacement hardware parts. Moreover, manual requests are fraught with errors and fraud and often lead to incorrect replacement hardware components being manufactured and supplied, or lead to unnecessary replacement hardware components.

SUMMARY

Systems and methods are disclosed herein for predicting a likelihood that a hardware component will be required by an aircraft entity based on aircraft signals (e.g., aircraft sensor data). The likelihood is derived by applying the aircraft signals to a machine learning model, which is trained to output the likelihood using historical data (e.g., data particular to that aircraft entity). The likelihood is optionally combined with other signals (e.g., historical interactions with the aircraft entity, information particular to the parts supplier, and so on), which are together input into a second machine learning model that is used to output a score. Where queries are received for hardware components, those queries are ordered based on the scores of the hardware components to which they correspond, enabling a parts supplier to identify and prioritize queries that are likely to correspond to aircraft hardware components that actually require replacement.

In an embodiment, an aircraft component service receives a data query from a source, the data query associated with a hardware component. The device determines a likelihood that an aircraft of an aircraft entity associated with the data query will require the hardware component by retrieving a plurality of signals received from the aircraft entity that are associated with the hardware component, applying the plurality of signals to a first machine-learned model, and receiving, as output from the first machine-learned model, a likelihood that the aircraft will require the hardware component. The device inputs the likelihood into a second machine-learned model, and receives as output a score corresponding to the data query. The device assigns a rank to the data query based on its score as compared to scores of other data queries of a plurality of data queries, and displays an ordered list of the plurality of data queries.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The FIGS. and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Aircraft Component Service—Exemplary System Environment

Figure 1:
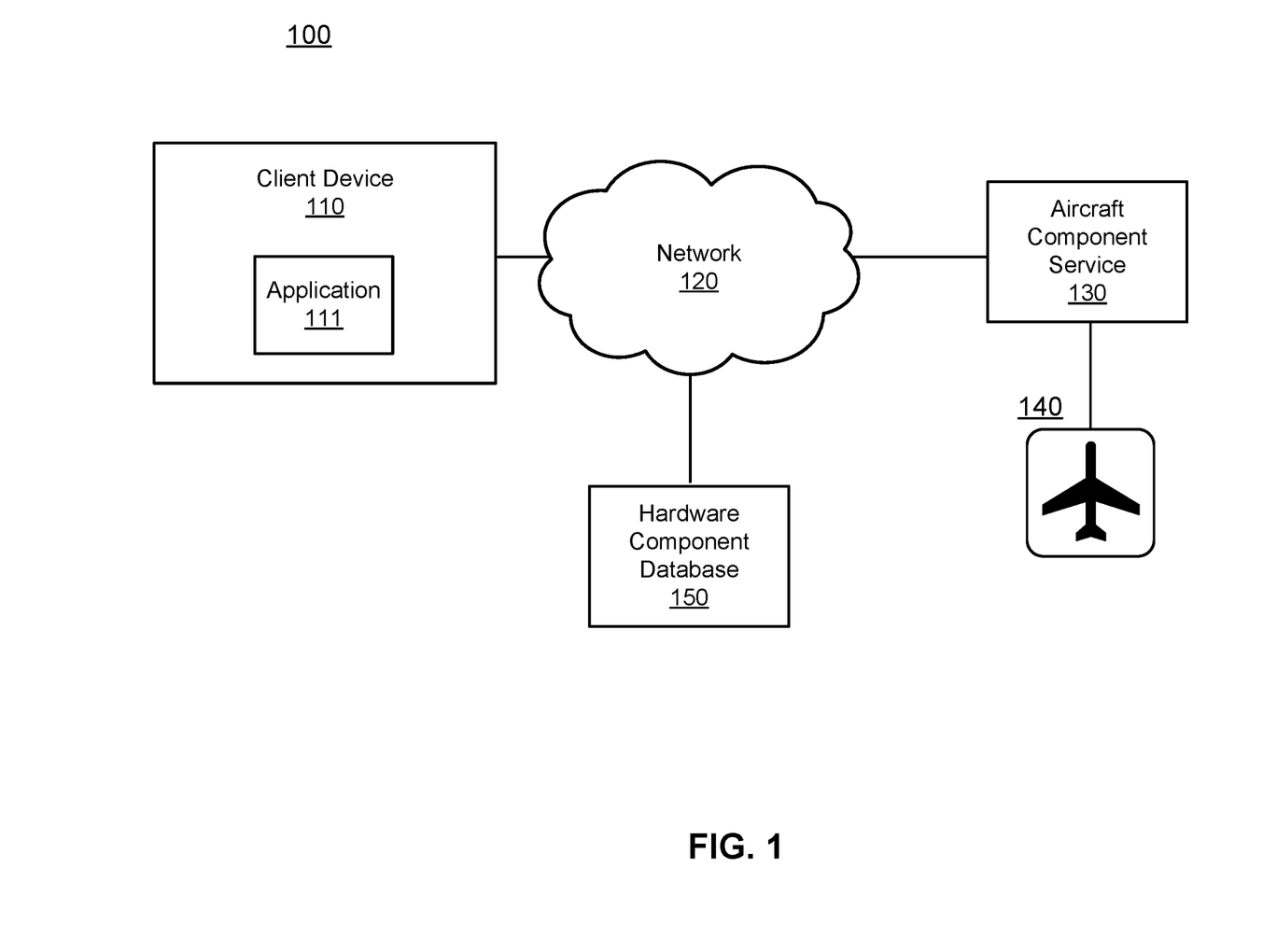
FIG. 1 illustrates one embodiment of a system environment for implementing an aircraft component service.

FIG. 1 illustrates one embodiment of a system environment for implementing an aircraft component service. As depicted in FIG. 1, system 100 includes client device 110 with application 111 installed thereon, network 120, aircraft component service 130, aircraft entity 140, and hardware component database 150. Client device 110 may be any device configured to receive input from a user and communicate with aircraft component service 130. Exemplary client devices include personal computers, smartphones, tablets, Internet-of-Things (IoT) devices, laptops, kiosks, and so on. Communications between client device 110 and aircraft component service may be managed by application 111.

Application 111 may be a specialized application (e.g., downloaded from aircraft component service or provided by aircraft component service 130 for download through a third-party system), or may be accessed through a browser installed on client device 110. Application 111 may operate differently depending on credentials of a user operating client device 110. For example, application 111 may operate to receive input from a user who provides aircraft hardware components, and may operate to display a ranked list of data queries for a user who is selecting a query relating to aircraft hardware components.

Network 120 may be any network that transmits data communications between at least client device 110 and aircraft component service 130. Network 120 may transmit data communications between any entity shown in FIG. 1, as well as any entity discussed herein but not shown in FIG. 1. Exemplary data networks include the Internet, a wide area network, a local area network, a WiFi network, and any other network that transfers data between electronic devices.

Aircraft component service 130 receives signals from aircraft entities (e.g., aircraft entity 140), and determines therefrom a likelihood that an aircraft will require a hardware component. Aircraft component service 130 also receives data queries from client devices 130, and ranks those data queries based on hardware components indicated by the data queries as mapped to the determined likelihoods. Further details of aircraft component service 130 are described below with respect to at least FIG. 2.

Aircraft entity 140 may be an aircraft or an entity that stores and communicates information about one or more aircraft. Aircraft entity 140 transmits signals to aircraft component service 130. These signals may be transmitted directly or may be transmitted using network 120. Further details about the types of signals transmitted to aircraft component service 130 and what causes those signals to be transmitted is described in further detail below with reference to FIGS. 2-3.

Hardware component database 150 is a database that stores information about hardware components. The information may indicate anything about a hardware component, such as typical lifetime of a component before it needs to be replaced, availability of hardware components from one or more component suppliers, and so on. There may be multiple hardware component databases 150, each specific to aircraft entities and/or component suppliers. Alternatively or additionally, a hardware component database 150 may house information corresponding to multiple aircraft entities and/or component suppliers.

Aircraft Component Service—Modules and Databases

Figure 2:
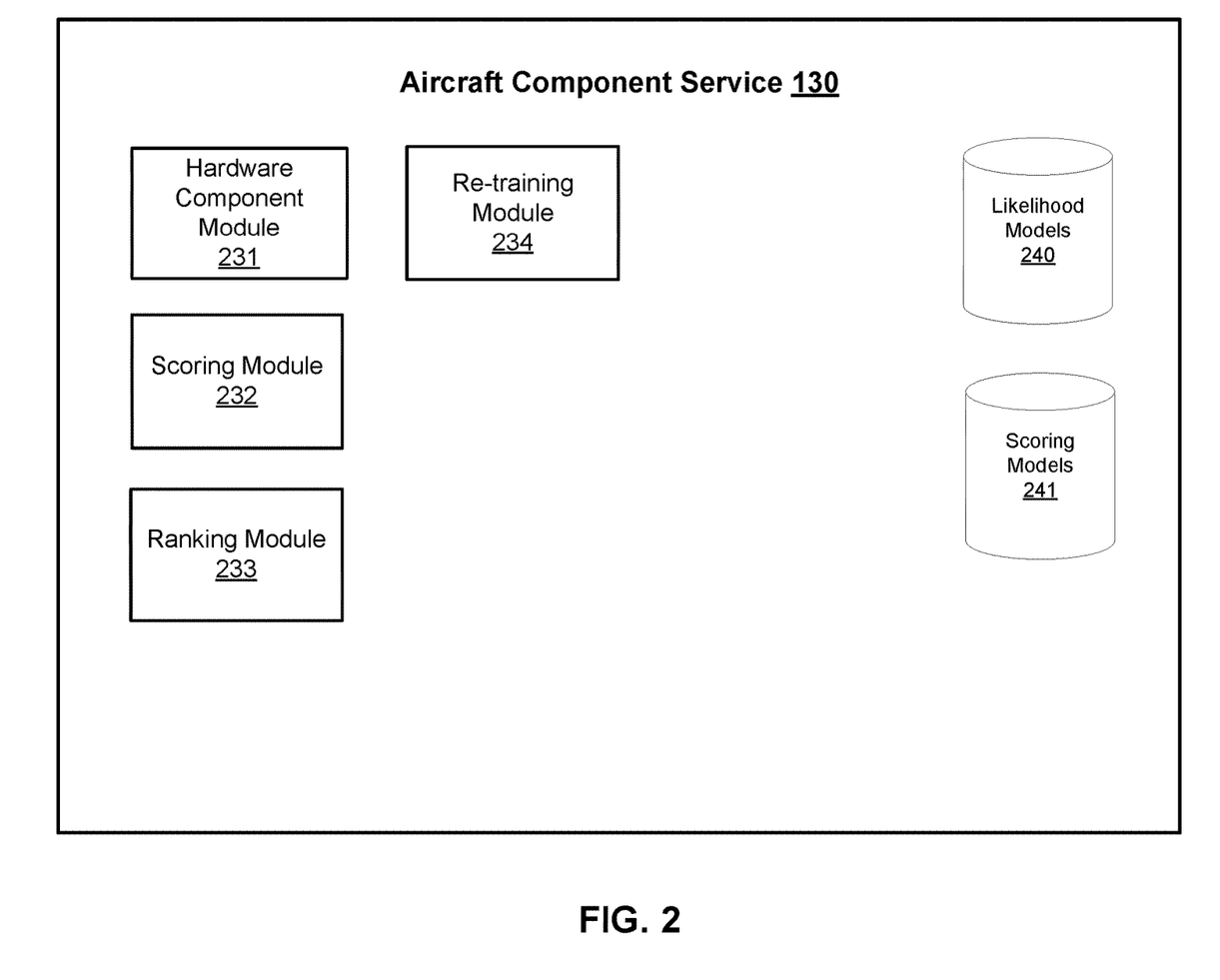
FIG. 2 illustrates one embodiment of exemplary modules and databases used by the aircraft component service.

FIG. 2 illustrates one embodiment of exemplary modules and databases used by the aircraft component service. As depicted in FIG. 2, aircraft component service 130 includes hardware component module 231, scoring module 232, ranking module 233, re-training module 234, likelihood models 240, and scoring models 241. The modules and databases depicted in FIG. 2 are merely exemplary; fewer or more modules and/or databases may be used to achieve the functionality described herein. Moreover, some or all functionality of aircraft component service 130 may be distributed and/or instantiated at client device 110 (e.g., on application 111) and/or at aircraft entity 140.

Hardware component module 231 receives a signal from an aircraft entity (e.g., aircraft entity 140) and/or an entity that is associated with hardware component replacement. As used herein, the term signal may refer to data that relates to an aircraft hardware component from which a likelihood of replacement of that hardware component may be derived. In an embodiment, a signal may include sensor data, the sensor data corresponding to a particular hardware component of the aircraft. The sensor data may be data transmitted directly from an aircraft sensor to aircraft component service 130. Additionally or alternatively, the sensor data may be transmitted to a controller of the aircraft or the aircraft entity, which in turn aggregates the sensor data from multiple sensors and/or multiple times and transmits the aggregation to aircraft component service 130. In an embodiment, the signal may include scheduling data for maintenance relating to the hardware component. For example, a calendared date for maintenance may correlate to a need to replace that hardware component. The signal may be derived from a technical analytic system, such as a system that determines fault with aircraft components (e.g., a leak valve replacement indicator).

As another example, the signal may come from an entity other than the aircraft entity. For example, a number of data queries relating to a hardware component may be used as a signal. As another example, a number of entities from which data queries relating to a hardware component may be used as a signal. Any input associated with a hardware component may be used as a signal for determining a likelihood of replacement of a hardware component.

Hardware component module 231 stores signals in association with the hardware components to which they relate. Responsive to receiving a data query associated with a given hardware component, hardware component module 231 applies the signals associated with the hardware component to a likelihood model from likelihood models 240. A likelihood model is a machine-learned model (e.g., convolutional neural network, deep learning, neural network, or any applicable model) trained using training data. Initially, the training data may include historical training data having historical signals labeled with an indication of whether the hardware component was replaced. The training data optionally indicates an amount of time between receipt of the signal and replacement of the hardware component. The historical training data may be anonymized aggregated data relating to multiple aircraft entities.

In an embodiment, the likelihood model may be re-trained as new signals are received. For example, the likelihood model may be initially trained using the historical training data. When a new signal is received, re-training module 234 may determine whether, within a threshold amount of time of receiving the new signal, the hardware component was replaced (e.g., based on data received from aircraft entity 140 indicating replacement of the hardware component and/or data from any entity indicating that a replacement of the hardware component was provided to aircraft entity 140). The threshold amount of time may vary based on the hardware component (e.g., using a thresholds derived based on the historical training data, such as by performing a statistical aggregation on labels of the amount of time between receiving a historical signal and replacement). For example, a component that normally is replaced after a year passes from when a given signal receives may have a one-year threshold, whereas a component that is normally replaced a day after a year passes from when a given signal is received may have a one-day threshold. A buffer may be applied to account for potential variance (e.g., apply a 1.2 day threshold where a mean amount of time is one day before replacement, and a standard deviation is 0.2 days). Responsive to determining that the hardware component was or was not replaced within the threshold amount of time, re-training module 234 may update a strength of association (to be stronger if the component was replaced, and weaker if not replaced) between the new signal and a likelihood that the hardware component will be replaced based on whether the hardware component was replaced. The strength of association may be further influenced by an amount of time between receiving the new signal and a time that the hardware component was replaced. Alternatively, re-training module 234 may add the signal and a label of whether the hardware component was replaced (optionally also including a label for an amount of time of replacement) to a training set on which the likelihood model may be re-trained. Re-training module 234 may re-train a likelihood model on any given schedule, periodically, a-periodically, or responsive to a triggering event (e.g., a threshold number of new signals have been received, or an administrator commands a re-training of the likelihood module).

In an embodiment, each aircraft entity of a plurality of aircraft entities has its own first machine-learned model trained using its own new signals. That is, given that different aircraft entities may have different replacement metrics, an aggregate model may not be as well tuned to a given aircraft entity to determine a likelihood of whether that aircraft entity will actually replace a hardware component. Thus, likelihood models 240 may be developed for any number of aircraft entities. Likelihood models 240 may be initialized using an aggregate historical training set, and may then be re-trained using data specific to a given aircraft entity which will, over time, cause each likelihood model to accurately reflect strengths of association between certain signals and their usefulness in predicting aircraft hardware component replacement.

Hardware component module 231 receives, as output from the likelihood model, a likelihood that an aircraft of the aircraft entity will require a hardware component corresponding to the data query. The likelihood may then be used, optionally along with other signals, to score the data query. Scoring module 232 scores data queries based on the respective likelihoods of hardware components indicated therein, and optionally, based on other data. Where only likelihoods are used, scoring module 232 may score data queries in order of their relative likelihoods (that is, from a highest to a lowest likelihood.

Where multiple signals in addition to likelihood are used, scoring module 232 applies the likelihood in addition to other signals to a scoring model (e.g., of scoring models 241). Scoring model may be any type machine-learned model described with respect to the likelihood model above. In an embodiment, the scoring model is trained using historical training data. The historical training data may label a source of the data query (e.g., a given aircraft entity or hardware component supplier) with an outcome of whether the source ultimately requested a replacement hardware component. Thus, where a given source frequently transmits a data query for a hardware component that the source does not ultimately replace, the scoring model would be trained to assign a lower score for future requests by that source. In such a scenario, scoring module 232 may apply, in addition to the likelihood for the hardware component, an indication of the source of the data query. Similarly, another signal may be an amount of present data queries received from the source, where training data may show that a large number of present requests tends to result in no replacement of a given aircraft component.

Additional signals may be used, where the scoring model is trained by applying at least a label indicating time to replace and/or whether the hardware component was replaced. Labels may also indicate a strength that the signal is associated with a replacement need. These signals may include any combination of whether a part is added to a work order for a given aircraft, whether a part is added to a work order quote. When a part is moved from a quote to an actual work order this may also be considered a signal, and may be labeled with a higher strength given that it was kept in scope when moving from a quote to a work order. A request is made to a particular parts supplier for a hardware component is also a signal, and may have a high strength because when the supplier is selected it is very likely that the part will be used. These are merely exemplary, any indicia of a part need at varying stages of part acquisition act as signals.

In an embodiment, scoring module 232 may determine an availability of the hardware component. Availability may be binary (is or is not available), or may be more complex, indicating an amount of time that it would take to obtain the hardware component. Scoring module 232 may apply the availability, along with the likelihood, to the scoring model. In such a scenario, the scoring model is trained using historical training data that labels an indication of availability with an indication of whether the past query for a part having that historical availability was actually replaced based on the past query. In an embodiment, availability may be determined using a separate machine learning model, where availability is determined by applying an identifier of the hardware component to a machine-learned model that is trained to output a determination of availability based on historical data comprising hardware component identifiers labeled with a historical length of time to obtain the hardware component.

Scoring module 232 receives as output from the second machine-learned model a score corresponding to the hardware component based on whatever inputs were supplied. Ranking module 233 ranks each data query of a plurality of data queries using their scores, and generate for display (e.g., on application 111) an ordered list of the plurality of data queries, as ordered based on the respective scores of the plurality of data queries.

Predicting Likelihood of Aircraft Hardware Component Replacement

Figure 3A:
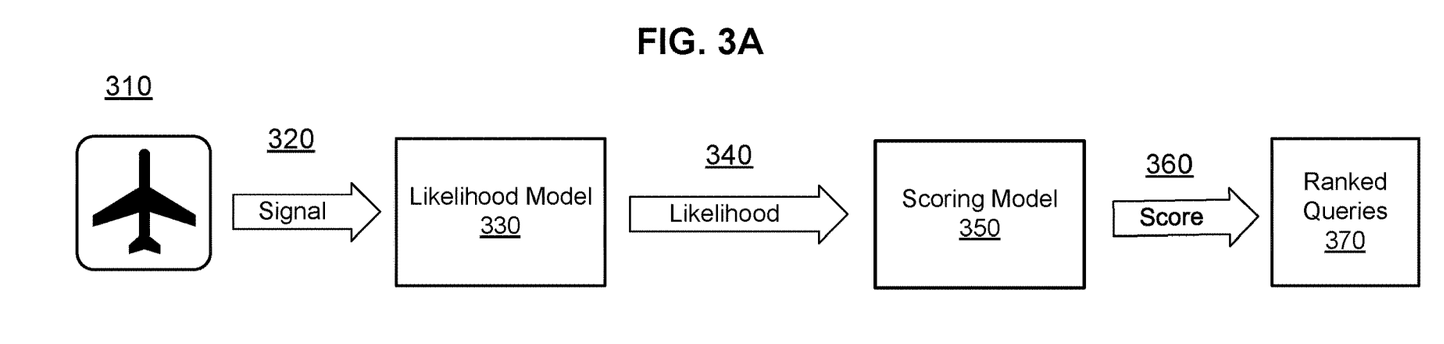
FIG. 3A illustrates one embodiment of an exemplary data flow for predicting a likelihood that an aircraft hardware component will require replacement.

FIG. 3A illustrates one embodiment of an exemplary data flow for predicting a likelihood that an aircraft hardware component will require replacement and ranking queries based on the likelihood. As depicted in FIG. 3, an aircraft entity 310 provides signals 320 relating to one or more hardware components. When a data query is received (e.g., from an aircraft entity, a materials supplier, or any other entity), the signals are applied to likelihood model 330, which outputs a likelihood 340 that the hardware component will actually be replaced. Scoring model 350 scores the data query based on the likelihood (and potentially other signals), and ranks queries 370. The ranked list of queries may be displayed to a user, thus enabling a user to prioritize queries relating to hardware components that are most likely to be replaced.

Figure 3B:
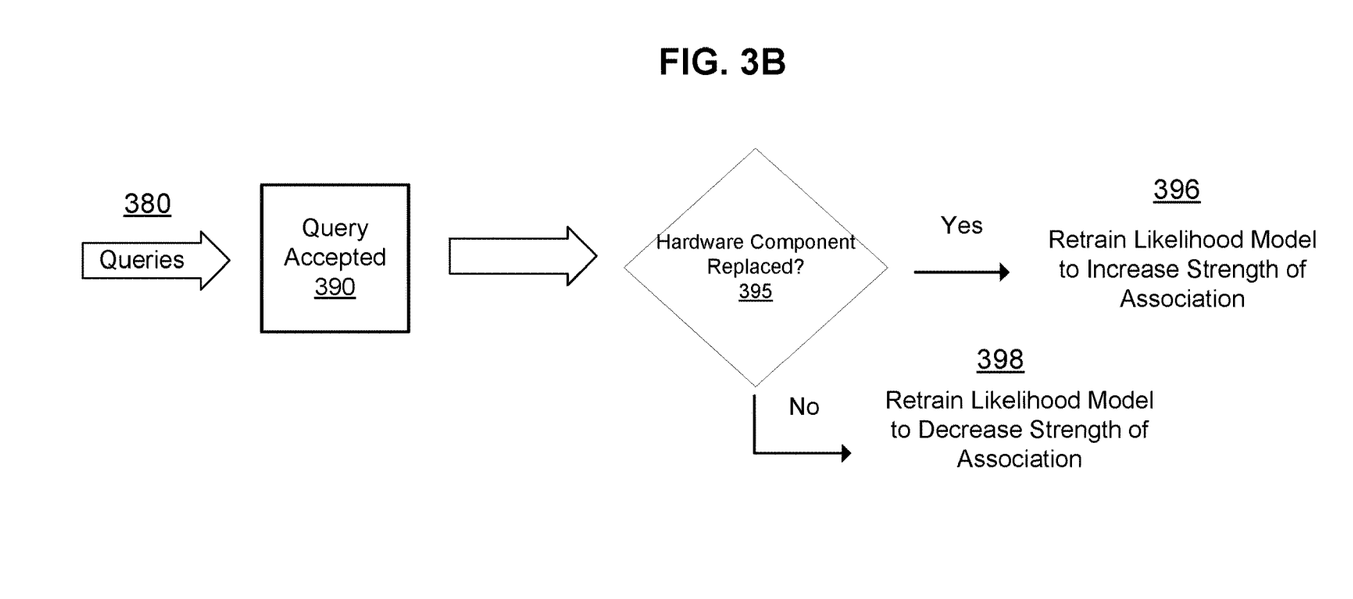
FIG. 3B illustrates one embodiment of an exemplary data flow for retraining a likelihood model.

FIG. 3B illustrates one embodiment of an exemplary data flow for retraining a likelihood model. As queries 380 are ranked and reviewed, a query 390 may be accepted. Following acceptance of a query, aircraft component service 130 determines whether the hardware component was replaced 395 (e.g., with reference to a threshold amount of time). Where the hardware component is replaced, re-training module 234 may re-train 396 a likelihood model by increasing a strength of association between one or more signals associated with the query with replacement, otherwise re-training module 234 may re-train 398 the likelihood model to decrease the strength of association.

Computing Machine Architecture

Figure 4:
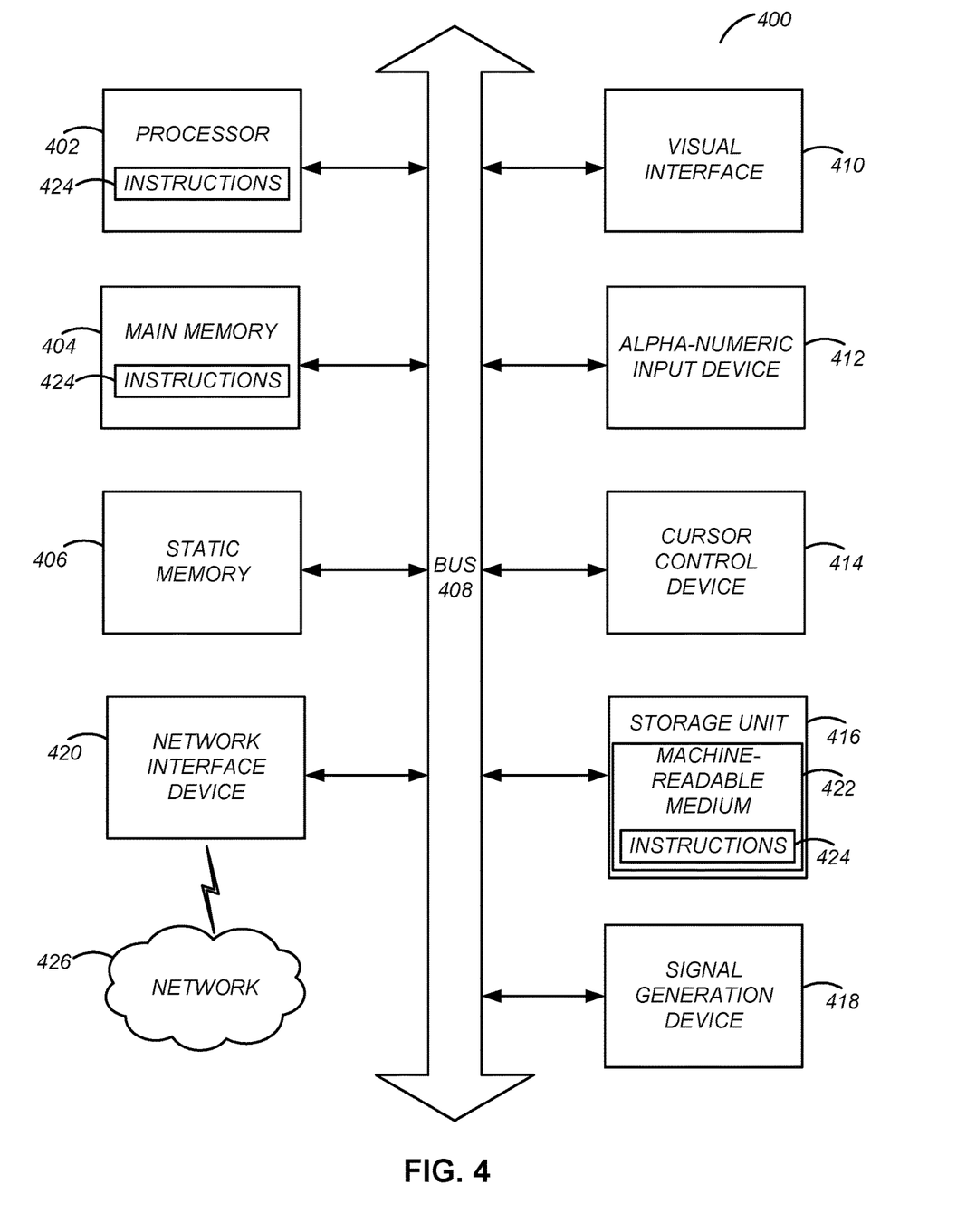
FIG. 4 is a block diagram illustrating components of an example machine able to read instructions from a machine-readable medium and execute them in a processor (or controller).

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alphanumeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Exemplary Process for Predicting Aircraft Hardware Component Replacement

Figure 5:
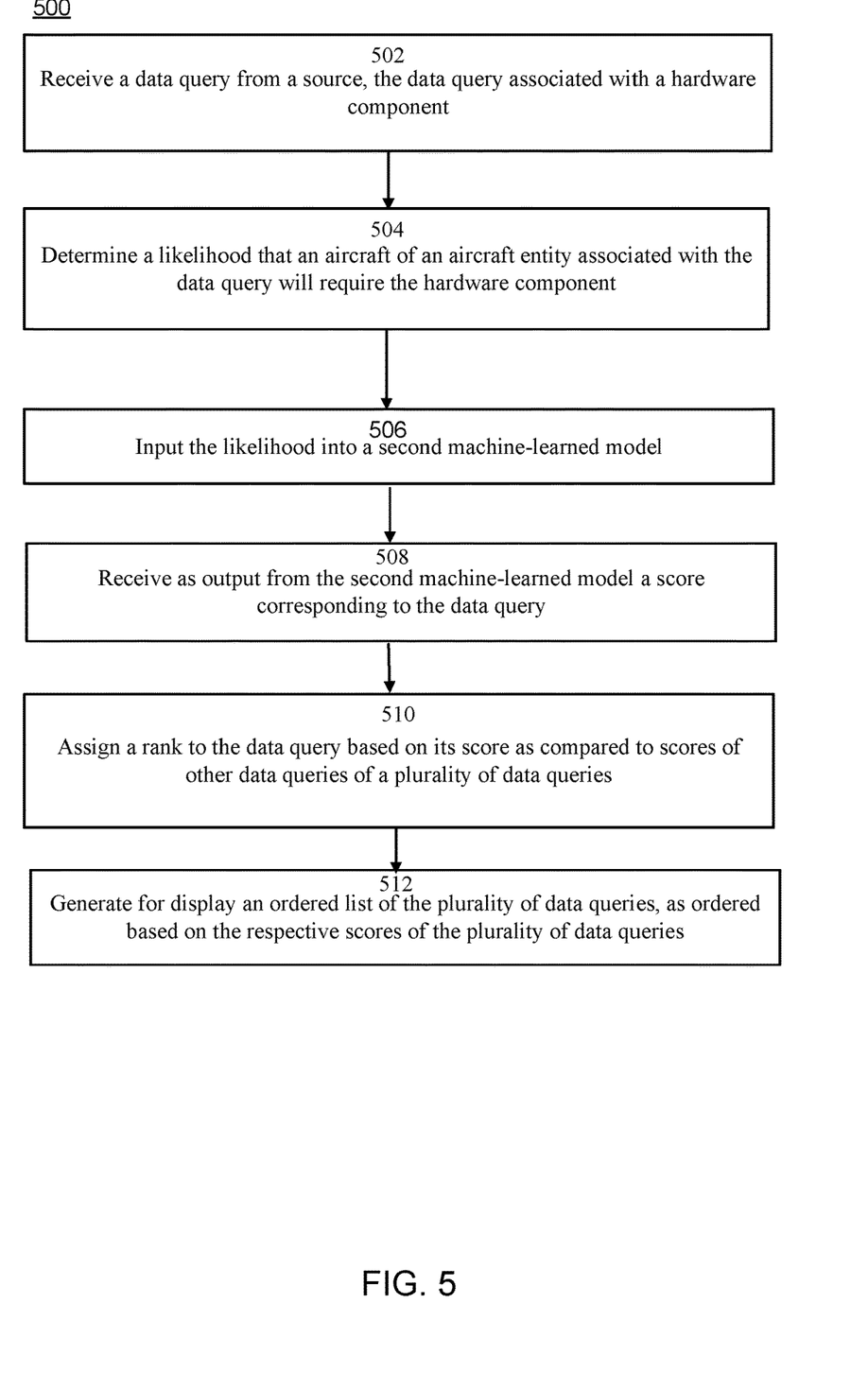
FIG. 5 illustrates a flow chart for an exemplary process for scoring and ranking hardware components based on a likelihood a hardware component will be required.

FIG. 5 illustrates a flow chart for an exemplary process for scoring and ranking hardware components based on a likelihood a hardware component will be required. Process 500 begins with one or more processors (e.g., processor 402) of aircraft component service 130 receiving 502 a data query from a source (e.g., client device 110 and/or aircraft entity 140), the data query associated with a hardware component. Aircraft component service 130 determines 504 a likelihood that an aircraft of an aircraft entity associated with the data query will require the hardware component (e.g.,using hardware component module 231). The likelihood may be determined by retrieving a plurality of signals received from the aircraft entity that are associated with the hardware component, applying the plurality of signals to a first machine-learned model (e.g., retrieved from likelihood models 240), and receiving, as output from the first machine-learned model, a likelihood that the aircraft will require the hardware component.

Aircraft component service 130 inputs 506 the likelihood into a second machine-learned model (e.g., scoring module 232 inputs the likelihood into one or more of scoring models 241, optionally with other signals). Aircraft component service 130 receives 508 as output from the second machine-learned model a score corresponding to the data query. Aircraft component service 130 assigns 510 a rank to the data query based on its score as compared to scores of other data queries of a plurality of data queries (e.g., using ranking module 233). Aircraft component service 130 generates for display 512 an ordered list of the plurality of data queries, as ordered based on the respective scores of the plurality of data queries.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for predicting aircraft component replacement through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims. References to "aircraft" components are exemplary throughout, and the components may be part of any other composition or vehicle wherever "aircraft" is stated herein.

What is claimed is:

1. A non-transitory computer-readable medium comprising memory with instructions encoded thereon, the instructions, when executed, causing one or more processors to perform operations, the instructions comprising instructions to:
   receive a data query from a source, the data query associated with a hardware component;
   determine a likelihood that an aircraft of an aircraft entity associated with the data query will require the hardware component by:
   retrieving a plurality of signals received from the aircraft entity that are associated with the hardware component;
   applying the plurality of signals to a first machine-learned model; and
   receiving, as output from the first machine-learned model, the likelihood that the aircraft of the aircraft entity will require the hardware component, wherein the first machine-learned model is trained by:
   initially training the first machine-learned model with historical training data, the historical training data comprising historical signals labeled with an indication of whether the hardware component was replaced;
   receiving a new signal;
   determining whether, within a threshold amount of time of receiving the new signal, the hardware component was replaced; and
   updating a strength of association between the new signal and the likelihood that the hardware component will be replaced based on whether the hardware component was replaced;
   input the likelihood into a second machine-learned model;
   receive as output from the second machine-learned model a score corresponding to the data query;
   assign a rank to the data query based on its score as compared to scores of other data queries of a plurality of data queries; and
   generate for display an ordered list of the plurality of data queries, as ordered based on the respective scores of the plurality of data queries.

2. The non-transitory computer-readable medium of claim 1, wherein the plurality of signals comprises sensor data, the sensor data corresponding to a particular hardware component of the aircraft of the aircraft entity.

3. The non-transitory computer-readable medium of claim 1, wherein the plurality of signals comprises scheduling data for maintenance relating to the hardware component.

4. The non-transitory computer-readable medium of claim 1, wherein the strength of association is further influenced by an amount of time between receiving the new signal and a time that the hardware component was replaced.

5. The non-transitory computer-readable medium of claim 1, wherein each aircraft entity of a plurality of aircraft entities has its own first machine-learned model trained using its own new signals.

6. The non-transitory computer-readable medium of claim 1, wherein the instructions further comprise instructions to:
   input one or more additional signals into the second machine-learned model with the likelihood, wherein the score is further based on the one or more additional signals.

7. The non-transitory computer-readable medium of claim 6, wherein the plurality of data queries are received by a supplier of the hardware component, and wherein the one or more additional signals comprise data from the supplier.

8. The non-transitory computer-readable medium of claim 7, wherein the data from the supplier comprises an indication of whether the hardware component is available from the supplier.

9. The non-transitory computer-readable medium of claim 8, wherein, where the hardware component is not available from the supplier, the data comprises an indication of a length of time that it would take the supplier to acquire the hardware component, and wherein the indication is obtained by applying an identifier of the hardware component to a third machine-learned model, the third machine-learned model trained to output the indication based on historical data comprising hardware component identifiers labeled with a historical length of time to obtain the hardware component.

10. A method comprising:
    receiving a data query from a source, the data query associated with a hardware component;
    determining a likelihood that an aircraft of an aircraft entity associated with the data query will require the hardware component by:
    retrieving a plurality of signals received from the aircraft entity that are associated with the hardware component;
    applying the plurality of signals to a first machine-learned model; and
    receiving, as output from the first machine-learned model, the likelihood that the aircraft of the aircraft entity will require the hardware component, wherein the first machine-learned model is trained by:

initially training the first machine-learned model with historical training data, the historical training data comprising historical signals labeled with an indication of whether the hardware component was replaced;
receiving a new signal;
determining whether, within a threshold amount of time of receiving the new signal, the hardware component was replaced; and
updating a strength of association between the new signal and the likelihood that the hardware component will be replaced based on whether the hardware component was replaced;
inputting the likelihood into a second machine-learned model;
receiving as output from the second machine-learned model a score corresponding to the data query;
assigning a rank to the data query based on its score as compared to scores of other data queries of a plurality of data queries; and
generating for display an ordered list of the plurality of data queries, as ordered based on the respective scores of the plurality of data queries.

11. The method of claim 10, wherein the plurality of signals comprises sensor data, the sensor data corresponding to a particular hardware component of the aircraft of the aircraft entity.

12. The method of claim 10, wherein the plurality of signals comprises scheduling data for maintenance relating to the hardware component.

13. The method of claim 10, wherein the strength of association is further influenced by an amount of time between receiving the new signal and a time that the hardware component was replaced.

14. The method of claim 10, wherein each aircraft entity of a plurality of aircraft entities has its own first machine-learned model trained using its own new signals.

15. The method of claim 10, wherein the method further comprises:
inputting one or more additional signals into the second machine-learned model with the likelihood, wherein the score is further based on the one or more additional signals.

16. The method of claim 15, wherein the plurality of data queries are received by a supplier of the hardware component, and wherein the one or more additional signals comprise data from the supplier.

17. The method of claim 16, wherein the data from the supplier comprises an indication of whether the hardware component is available from the supplier.

18. The method of claim 17, wherein, where the hardware component is not available from the supplier, the data comprises an indication of a length of time that it would take the supplier to acquire the hardware component, and wherein the indication is obtained by applying an identifier of the hardware component to a third machine-learned model, the third machine-learned model trained to output the indication based on historical data comprising hardware component identifiers labeled with a historical length of time to obtain the hardware component.

* * * * *